(12) United States Patent
Bentley et al.

(10) Patent No.: US 9,948,080 B2
(45) Date of Patent: Apr. 17, 2018

(54) CABLE SPACER CLAMP ARM LINER

(71) Applicant: Preformed Line Products, Mayfield Village, OH (US)

(72) Inventors: John Alexander Bentley, Hampshire (GB); Simon Thomas Clinton, Hampshire (GB)

(73) Assignee: PREFORMED LINE PRODUCTS CO., Mayfield Village, OH (US)

( * ) Notice: Subject to any disclaimer, the term of this patent is extended or adjusted under 35 U.S.C. 154(b) by 0 days.

(21) Appl. No.: 14/984,061

(22) Filed: Dec. 30, 2015

(65) Prior Publication Data
US 2017/0194781 A1    Jul. 6, 2017

(51) Int. Cl.
*H02G 7/14* (2006.01)
*H02G 7/12* (2006.01)
*F16L 3/10* (2006.01)
*F16L 3/202* (2006.01)

(52) U.S. Cl.
CPC ........... *H02G 7/125* (2013.01); *F16L 3/1075* (2013.01); *F16L 3/202* (2013.01)

(58) Field of Classification Search
CPC ........... H02G 7/125; H02G 7/05; H02G 7/14; H02G 15/00; H02G 7/00; H02G 7/053; H02G 7/18; H02G 15/007; F16L 3/1066; F16L 3/1075; F16L 3/12; F16L 3/00
USPC ..... 174/40 CC, 40 R, 44, 43, 45 TD, 40 TD, 174/70 A, 42; 248/74.1, 65, 74.2, 74.3, 248/49, 68.1
See application file for complete search history.

(56) References Cited

U.S. PATENT DOCUMENTS

| | | | |
|---|---|---|---|
| 3,161,721 A | 12/1964 | Torr | |
| 3,716,650 A | 2/1973 | de Mecquenem | |
| 6,043,433 A | 3/2000 | Schweitzer, Jr. | |
| 6,096,970 A * | 8/2000 | Katoh | H02G 7/053 |
| | | | 174/40 CC |
| 6,198,042 B1 | 3/2001 | Huston | |
| 6,753,750 B1 | 6/2004 | Posadas-Sánchez | |
| 6,774,303 B1 * | 8/2004 | Brittain | H02G 7/14 |
| | | | 174/40 R |
| 7,378,593 B2 | 5/2008 | Bukovnik et al. | |
| 8,309,846 B2 * | 11/2012 | Espindola | H02G 7/14 |
| | | | 174/40 CC |
| 8,500,073 B2 * | 8/2013 | Quesnel | H02G 7/053 |
| | | | 248/74.1 |

(Continued)

FOREIGN PATENT DOCUMENTS

| | | |
|---|---|---|
| EP | 2544321 B1 | 3/2014 |
| GB | 1587233 | 4/1981 |
| WO | 2008/086480 A1 | 7/2008 |

OTHER PUBLICATIONS

Int. Search Report/Written Opinion cited in PCT Application No. PCT/US2015/068042 dated Jul. 22, 2016, 13 pgs.

*Primary Examiner* — Angel R Estrada
(74) *Attorney, Agent, or Firm* — Cooper Legal Group, LLC

(57) ABSTRACT

A liner for use with a cable spacer clamp arm is provided. The liner includes a first portion formed in an arcuate configuration and made from a first elastomeric material. A second portion is formed in the arcuate configuration and is receivable within the first portion. The second portion is made from a second elastomeric material different from the first elastomeric material. The first portion attaches to the second portion.

20 Claims, 4 Drawing Sheets

(56) References Cited

U.S. PATENT DOCUMENTS 9,000,299 B2 4/2015 Ruth
2014/0216808 A1 8/2014 Ahlisch et al.

* cited by examiner

CABLE SPACER CLAMP ARM LINER

TECHNICAL FIELD

This disclosure generally relates to cable spacer clamp arms. In particular, this disclosure relates to a liner providing a cushion between a conductive cable and a spacer clamp arm.

BACKGROUND

Overhead high voltage power transmission or distribution systems typically have a plurality of electrically conductive cables. Spacer clamp arms are used to reduce the possibility of the conductive cables contacting one another, the generation of corona discharge, and the creation of electrical stress and interference. The spacer clamp arm has an elongated arm portion and a cable keeper end portion at one end of the arm. A spacer clamp arm grips a respective conductive cable at the keeper end portion. The other end of the spacer clamp arm is attached to a frame which may have one or more additional spacer clamp arms attached. The spacer clamp arms permit a limited amount of movement of the spacer clamp arms with respect to the frame, and also provide a controlled electrically semi-conductive path between the spacer clamp and the frame, both of which are usually made of metal.

The keeper end portion defines an opening through which a conductive cable passes. The keeper end portion has a hinge structure that can pivot between an open and closed position. In the open position, the keeper end portion of the spacer clamp arm receives the conductive cable. The spacer clamp arm is then clamped shut. A molded rubber clamp liner is placed between the conductive cable and the keeper end portion of the spacer clamp arm.

The known clamp liner is typically rated for use up to 120 degrees centigrade of continuous conductive cable temperature. With the advent of composite core conductors and increased demand for electrical power, conductive cable temperatures often exceed the limit of the known clamp liner. Silicone rubbers can withstand the relatively high surface temperatures but have poor electrical semi-conductive properties. Thus, a need exists for an improved clamp liner capable of withstanding relatively higher conductor temperatures with good electrical semi-conductive properties at a reasonable cost.

SUMMARY

This summary is provided to introduce concepts in a simplified form that are further described below in the detailed description. This summary is not intended to identify key factors or essential features of the claimed subject matter, nor is it intended to be used to limit the scope of the claimed subject matter.

According to one aspect, an improved liner for use with a cable spacer clamp arm is provided. The liner includes a first portion formed in a generally arcuate configuration and made from a first elastomeric material. A second portion is formed in a generally arcuate configuration and is receivable within the first portion. The second portion is made from a second elastomeric material different from the first material. The first portion attaches to the second portion.

According to another aspect, a liner for use with a cable spacer clamp arm is provided. The liner includes a pair of liner halves. Each liner half has a first portion formed in a generally arcuate configuration and made from a first semi-conductive elastomeric material. A second portion of each liner half is formed in a generally arcuate configuration and is receivable within the first portion. The second portion is made from a second semi-conductive elastomeric material different from first semi-conductive elastomeric material. The first portion attaches to the second portion. An inner concave surface is on each first portion. An outer convex surface is on each second portion and is sized and shaped to be received in intimate contact with the inner concave surface of a respective first portion.

According to yet another aspect, an apparatus includes a conductive cable. A spacer clamp arm receives the conductive cable. A liner is receivable in the spacer clamp arm and receives the conductive cable. The liner includes a first portion formed in a generally arcuate configuration and made from a first elastomeric material. A second portion of each liner half is formed in a generally arcuate configuration and is receivable within the first portion. The second portion is made from a second elastomeric material different from the first elastomeric material. The first portion attaches to the second portion. An inner concave surface is on the first portion. An outer convex surface is formed on the second portion and is sized and shaped to be received in intimate contact with the inner concave surface of the first portion.

The following description and drawings set forth certain illustrative embodiments, aspects and implementations. These are indicative of but a few of the various ways in which one or more aspects may be employed. Other aspects, advantages, and novel features will become apparent from the following detailed description when considered in conjunction with the accompanying drawings.

DETAILED DESCRIPTION

Figure 1:
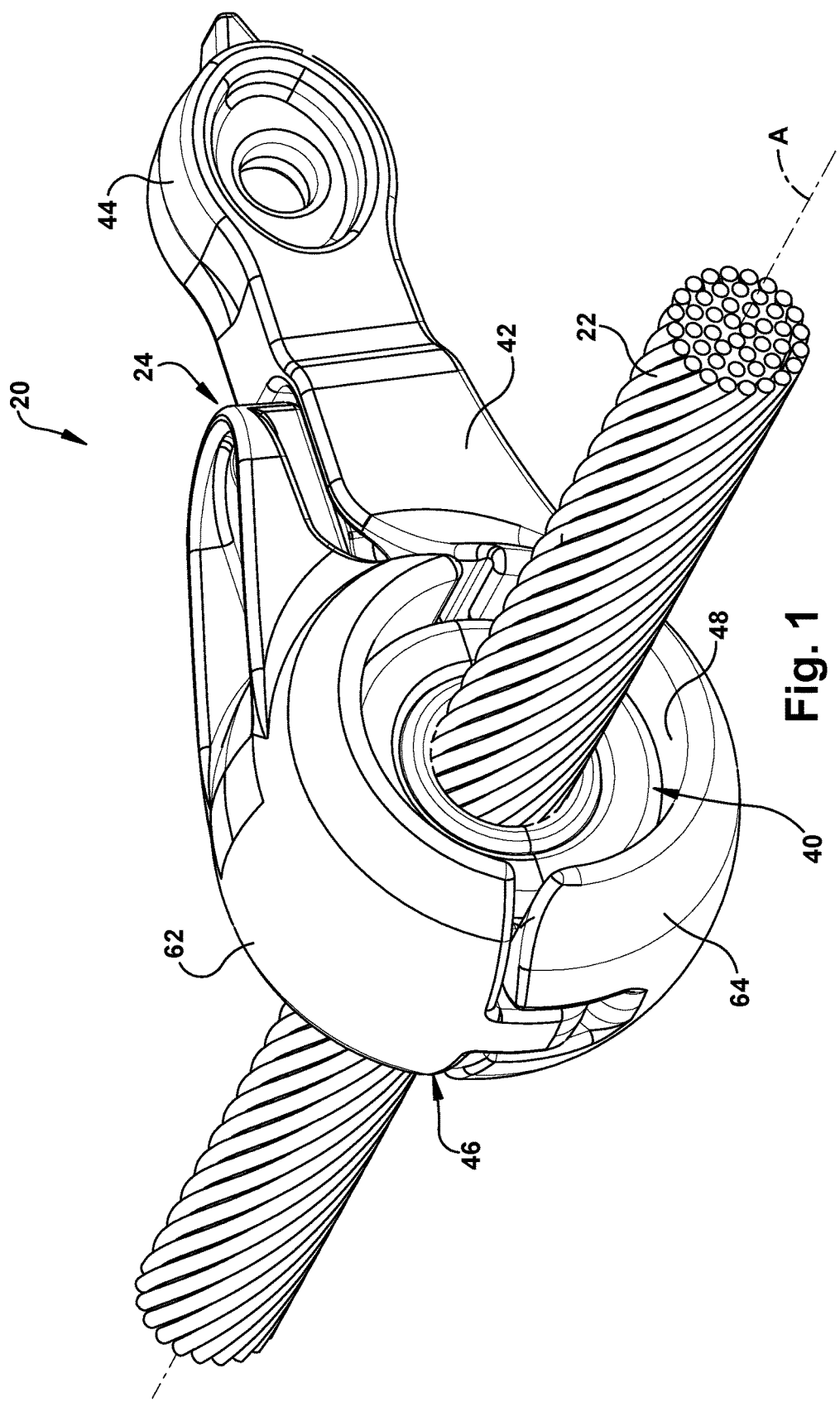
FIG. 1 is a perspective view of a cable spacer clamp arm incorporating a liner, according to one aspect.

The claimed subject matter is described with reference to the drawings, in which like reference numerals are used to refer to like elements throughout. In the following description, for purposes of explanation, numerous specific details are set forth in order to provide an understanding of the claimed subject matter. It will be apparent, however, that the claimed subject matter can be practiced without these specific details.

This disclosure relates to spacer dampers of the type typically used for spacing bundled electrical conductors suspended from transmission pylons, towers or poles. In particular, this disclosure relates to a clamp arm liner or bushing for use in cable spacer clamp arms of such spacer dampers or other cable securing and support mechanisms.

Overhead transmission lines typically operate at voltages in the range of 275 kV to 400 kV, and may operate at up to 600 kV. At these voltages, it is important that spacer dampers and other spacers that incorporate spacer clamp arms and related components are designed to achieve the required minimum corona discharge performance, in order to avoid the generation of visible corona during operation. Visible corona may be generated particularly in areas where electrical stress is concentrated. Thus, the spacer clamp arms are generally designed to avoid sharp edges and protrusions.

In order to operate effectively on transmission lines at 400 kV and above, overhead line components such as spacer dampers must be capable, in practice, of achieving corona free performance at voltages above 340 kV phase to ground. Typically, on twin conductor bundles, such performance has only been achieved using metallic clamps which directly grip relatively hard aluminum alloy conductors. Although adequate performance is easier to achieve when using triple, quad or hex bundles, there is a growing trend for existing twin bundle conductors to be replaced with new high current composite core conductors in the same twin bundle configuration, rather than increasing the number of conductors, where it is desired to transmit increased electrical power. This is because increasing the number of conductors will require a costly upgrade in infrastructure. Upgrading the conductors economically allows existing infrastructure configurations to be used, despite the increased cost of the conductors themselves.

However, the new generation of conductors is being introduced, which places new demands on the clamps used to secure them. These conductors are composite core conductors made of mixed metals, or metal and synthetic materials in combination. The composite core conductors typically use a high tensile composite core (e.g., comprising steel, carbon fibre, etc.) with an outer layer (e.g., comprising pure aluminum) and/or an air cooled construction (e.g., GTZASCR).

The new composite core conductors can be used at high temperatures, typically above 130° C., and are, therefore, able to transmit increased power. Previously, in order to increase power transmission in an electrically conductive cable or transmission line, it was usual to increase the number of conductors in the bundle from two to three or four, typically using an All Aluminum Alloy Conductor (AAAC). With the increased power carrying capacity of the new generation of composite core conductors, there is likely to be a tendency to use just two conductors ('twin-bundled conductors'), but at increased power. The economic benefits of this include a reduction in the need to strengthen pylon, tower or pole metal work when increasing the number of conductors, by utilizing twin conductors at increased power.

Composite core conductors of the type described above are entering service around the world in increasing numbers. Compared with the conventional aluminum alloy conductors, or conductors having at least a hard aluminum alloy outer layer, the pure aluminum outer surface of these composite core conductors is much softer, and more prone to damage. In particular, the composite core conductors are typically intended for use at very high tensions in service, and at temperatures, for example above 130° C., at which pure aluminum starts to "creep". This combination of high tension and high temperature leaves the conductor particularly prone to being damaged or abraded by metal clamps, especially when vibration is present in the conductor span. In this connection, it should be noted that operating conductors at increased tensions increases the stress in the conductor. This increase in tension and stress leads to a reduction in the self-damping of the conductor and an increase in vibration amplitude, especially at high frequencies, which in turn increases vibration. This lowers the number of cycles that can be absorbed over the life of the conductor without failure, and makes it more important to effectively clamp the conductor at the clamp arm and damp the conductor.

In addition, due to the increased power loads typically carried by these new composite core conductors, the failure or breakage of a conductor strand is much more serious than on conventional conductors, since there is little or no extra power carrying capacity in failure mode. There is, therefore, a need for spacer dampers and clamping components suitable for gripping these new composite core conductors at the relatively high temperatures without damaging, by vibration, the soft aluminum outer surface of the conductor, while still providing the required slip resistance at high tensions. Furthermore, these components also need to be capable of providing corona free performance at about 340 kV phase to ground.

The cable spacer dampers include a spacer clamp arm. The spacer clamp arm is provided with a clamp liner or bushing which surrounds the conductor within the clamp arm. The clamp liner is used to enable the spacer clamp arm to grip soft aluminum conductor material, even at relatively high temperatures, while maintaining a target slip resistance and electrical resistance between about 1-20 MΩ, without causing damage to the conductor. Preferably, the geometry of the clamp arm and clamp liner relative to the conductor is arranged to provide in the region of 12%-18% compression in the clamp liner when the clamp arm is secured to the conductor, and preferably around 15%, which has been found to provide the required slip resistance at temperatures of above 130° C.

The known clamp liner is typically rated for use up to 125° C. of continuous conductor temperature. With the advent of the new composite core conductors and increased demand for electrical power, conductor temperatures often exceed the limit of the known clamp liner. Thus, a need exists for an improved clamp liner.

One or more aspects of an improved clamp liner 40 for a cable spacer system 20 (e.g., FIG. 1) will now be described, by way of example, with reference to the accompanying drawings. The clamp liner 40 protects a conductive cable 22 received therein by reducing bending strain on the cable 22 at a point where the cable 22 enters the spacer system 20. Given that the clamp liner 40 may be compressed to some degree, the clamp liner 40 also provides a degree of dampening with regard to vibrations along or within the cable.

Figure 2:
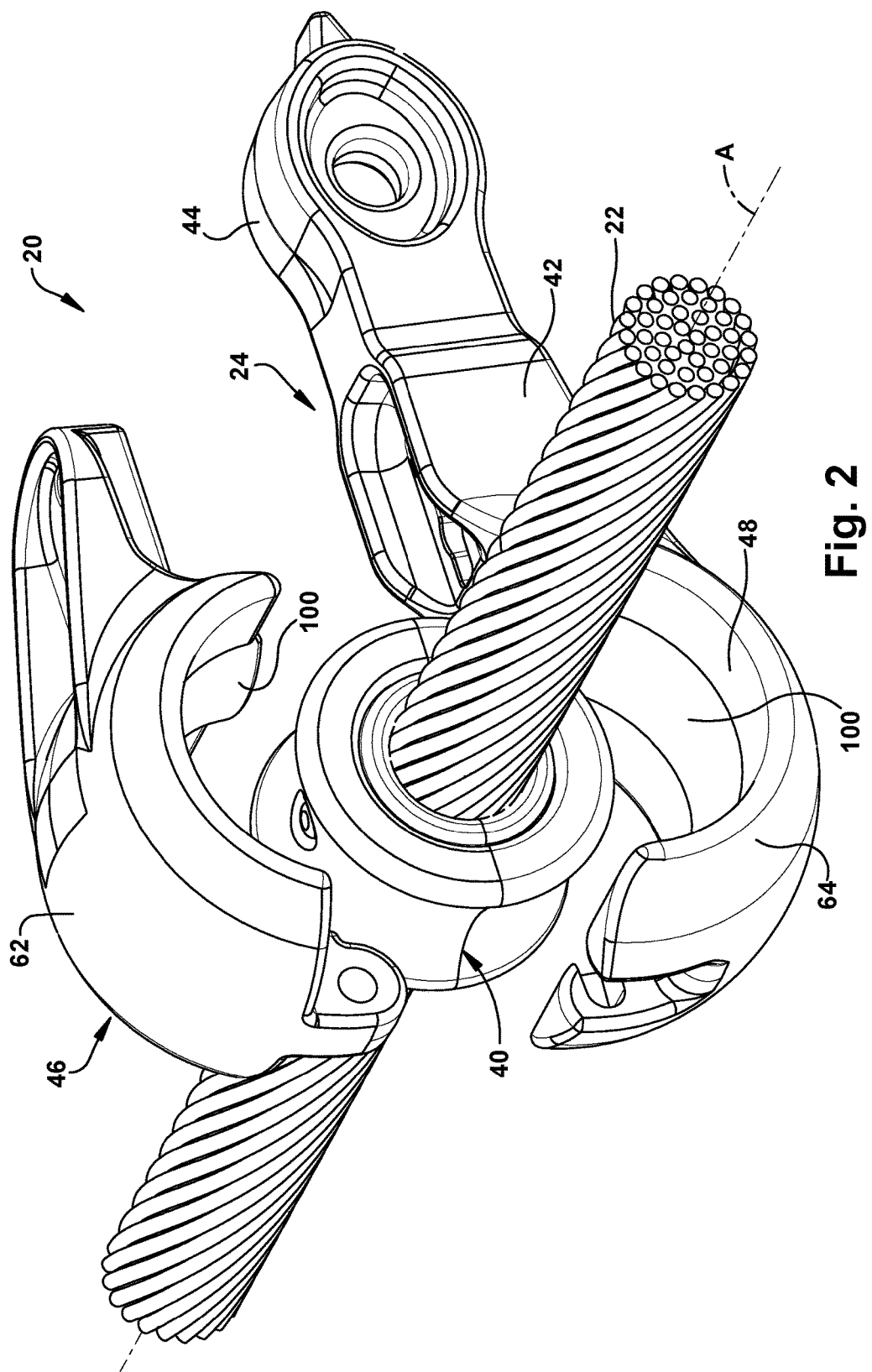
FIG. 2 is an exploded perspective view of the cable spacer clamp arm illustrated in FIG. 1.

The improved cable spacer system 20 includes at least one electrically conductive cable 22 and at least one cable spacer clamp arm 24. The cable spacer clamp arm 24 is illustrated in FIG. 1 in a closed or clamped position securing the conductive cable 22 along the axis A of the conductive cable. In FIG. 2, the spacer clamp arm 24 is illustrated in an open exploded position or condition illustrating the location and configuration of an improved clamp liner 40, constructed according to the one aspect, along the axis A of the conductive cable.

Overhead high voltage power transmission or distribution systems typically have a plurality of electrically conductive cables, such as the conductive cable 22. Spacer dampers (not shown) with spacer clamp arms 24 (FIGS. 1 and 2) are used to minimize the possibility of the electrically conductive cables 22 contacting one another, minimize the generation of corona discharge and minimize stress and electrical interference between or among conductive cables.

The exemplary spacer clamp arm 24 is for use in spacer dampers for the separation of multiple transmission conductive cables, such as the conductive cable 22. The spacer clamp arm 24 includes a central arm portion 42, a first or attachment end portion 44, and an opposite second or keeper end portion 46. The keeper end portion 46 includes a hinge structure and is located at an end distal from the spacer damper frame. In use, that the spacer clamp arm 24 can be hinged between open and closed positions, and clamped around the conductive cable 22. At least the distal end of the keeper end portion 46 of the spacer clamp arm 24 is preferably formed in the general shape of a sphere which is truncated in a direction along the axis A. This shape has been found to provide improved corona performance, particularly at high transmission voltages.

In order to further improve the corona performance of the spacer clamp arm 24, a hinge arrangement is preferably formed using a hidden hinge pin (not shown), which is located within blind bores or slots in the spacer clamp arm or keeper members. The hidden hinge pin does not extend beyond the outside surface of the distal end of the spacer clamp arm 24, thereby allowing the exterior surface to include a reduced number of discontinuities and provide a smoother exterior contour. In other words, the exterior surface of the distal end of the spacer clamp arm 24 forms a continuous surface over the ends of the hinge pin. With this arrangement, it has been found possible to achieve corona free performance at about 340 kV phase to ground, on a twin bundle conductor.

The keeper end portion 46 has a hinge structure that enables pivot between a closed position or condition, as illustrated in FIG. 2, and an open position or condition, as illustrated in FIG. 1. In the open position, the keeper end portion 46 of the spacer clamp arm 24 receives the conductive cable 22. The spacer clamp arm 24 is then moved to the closed or clamped position to secure the conductive cable 22. The spacer clamp arm 24 permits a limited amount of movement of the spacer clamp arm and conductive cable 22 with respect to the frame. The spacer clamp arm 24 also provides a controlled electrically semi-conductive path between the spacer clamp arm and the frame, both of which are usually made of metal.

The keeper end portion 46 has an upper portion 62 that is relatively pivotal relative to lower portion 64. The lower portion 64 is integrally formed into the central arm portion 42 of the spacer clamp arm 24. The upper portion 62 is movable to the closed position, illustrated in FIG. 1, to clamp and retain the conductive cable 22 within the spacer clamp arm 24.

The aspect of spacer clamp arm 24 shown in FIGS. 1 and 2 has been designed to achieve the required radio interference voltage (RIV) and corona performance on twin bundled conductors at voltages above 340 kV phase to ground. This is achieved through the unique geometry of the spacer clamp arm 24 described above.

The first or attachment end portion 44 of the spacer clamp arm 24 connects to a spacer damper frame (not shown), which may have one or more additional spacer clamp arms attached, for relative pivotal movement. The keeper end portion 46 defines an opening 48 through which the conductive cable 22 is receivable.

A suitable fastener, such as a bolt or pin (not shown) is used to secure the upper portion 62 of the keeper end portion 46 to the lower portion 64 of the keeper end portion when the spacer clamp arm 24 is in the closed position. The clamp liner 40 is compressed by about 15% of its volume when the spacer clamp arm 24 is secured about the conductive cable 22 and the upper portion 62 is sufficiently fixed to the lower portion 64.

Figure 3:
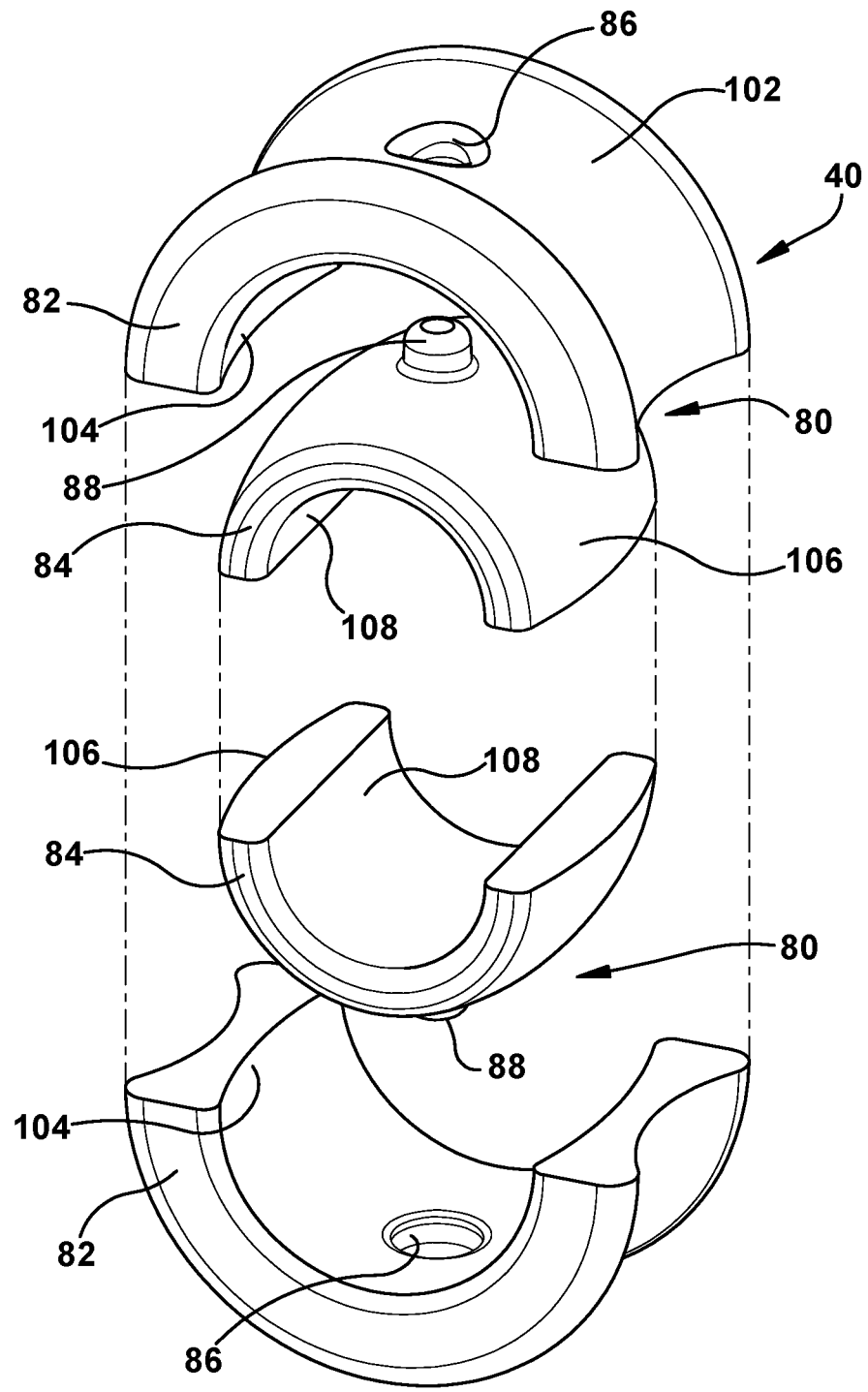
FIG. 3 is an enlarged exploded perspective view of the liner illustrated in FIGS. 1 and 2.
Figure 4:
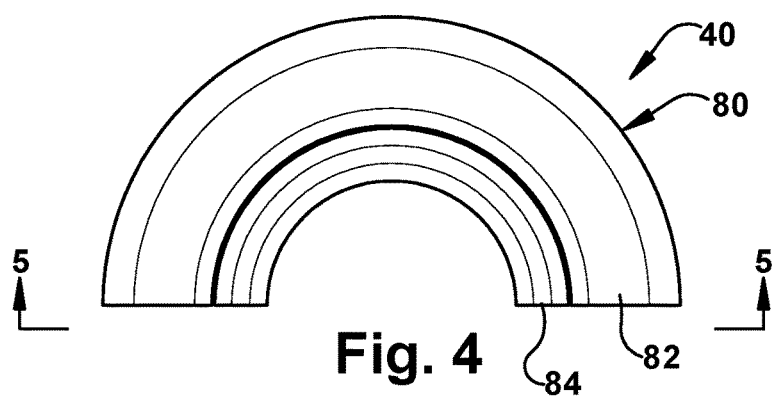
FIG. 4 is a front elevation view of a portion of the liner illustrated in FIG. 3.

In use, the conductive cable 22 is secured within the keeper end portion 46 of the spacer clamp arm 24. A clamp liner 40 is located in the opening 48 between the conductive cable 22 and the keeper end portion 46. The clamp liner 40 (FIG. 3) has a pair of substantially identical liner halves 80.

A molded rubber clamp liner 40, according to one aspect, is placed between the conductive cable 22 and the keeper end portion 46 of the spacer clamp arm 24. The clamp liner 40 protects the conductive cable 22 and also provides a degree of damping.

Each of the liner halves 80 is formed into an approximately semi-circular cross-section configuration. Each of the liner halves 80 is placed in respective semi-circular recesses of the keeper end portion 46 which define the opening 48.

The clamp liner 40 (FIG. 3) includes two substantially identical liner halves 80. Each of the liner halves 80 includes an outer portion 82 and an inner portion 84. A half 80 of the clamp liner 40 can be molded or extruded as separate parts of their respective different material.

Each outer portion 82 of the liner halves 80 includes an opening 86 located approximately centrally, but each outer portion could be located anywhere along the arcuate length of the outer portion. Each of the inner portions 84 includes a projection 88 that is receivable in the opening 86 in the outer portion 82. This connects the outer and inner portions 82, 84 together and prevents relative axial and rotational movement between the outer and inner portions. The outer portion 82 and inner portion 84 of the liner half 80 can also be affixed by mechanical or other suitable means such as a lateral extruded profile, or by use of a plastic or metal rivet, self-tapping screw or other suitable means.

The outer portion 82 and inner portion 84 may be attached together or formed in a variety of ways. In the example illustrated in FIGS. 2 and 3, a mechanical connection is shown. It will be apparent that any type of mechanical fastening arrangement may be used, such as interlocking grooves, mechanical fasteners or adhesive bonding. It is also contemplated that the outer and inner portions 82, 84 can be formed separately and then molded together under heat and pressure in order to bond the outer and inner portions together. It is also contemplated that the outer and inner portions 82, 84 be co-extruded and integrally formed as one piece with two different materials.

Figure 5:
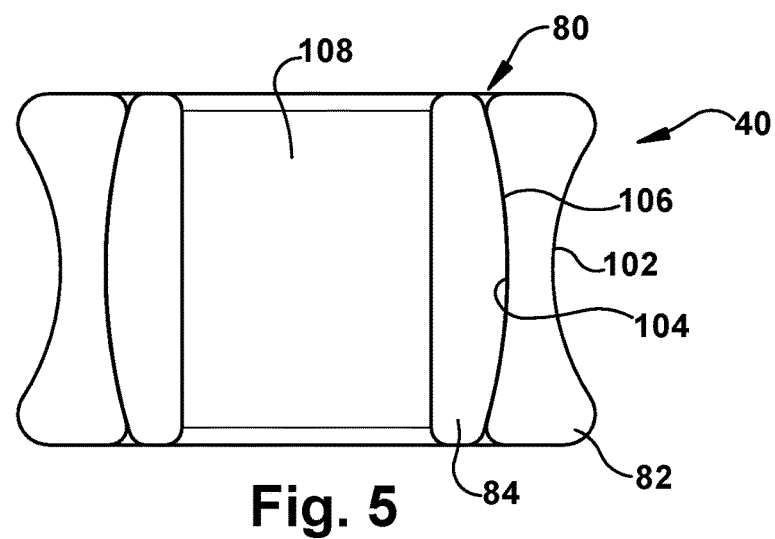
FIG. 5 is a plan view of the liner, viewed approximately along line 5-5 in FIG. 4.

The outer portion 82 of each liner half 80 includes an outer concave annular surface 102 (FIGS. 3 and 5) that is receivable about a convex inner surface 100 (FIG. 2) of the keeper end portion 46 of the spacer clamp arm 24. This interaction minimizes or prevents relative axial movement between the clamp liner 40, conductive cable 22 and the spacer clamp arm 24.

Each of the outer portions 82 also includes an annular inner concave surface 104 that extends completely around the outer periphery of the clamp liner 40. This annular inner concave surface 104 of the outer portion 82 receives an outer annular convex surface 106 of the inner portion 84 extending around the outer periphery of the inner portion 84. This interaction prevents relative movement in a direction along the axis A between the inner and outer portions 82, 84.

The profile of the interfacing surfaces 104, 106 has been designed as such to provide a lateral interference fit so that slip loads for the conductive cable 22 in the direction of the axis A (e.g., typically in excess of 1.5-2.5 kN) do not cause the inner portion 84 to separate from the outer portion 82. The attachment, fixing or bonding is only used as a method to keep the inner and outer portions 82, 84 together during manufacture, transit, application and installation.

According to one aspect, the clamp liner 40 is made of a high temperature resistant and semi-conductive elastomer capable of providing a secure grip without damage to the conductive cable 22 at temperatures above 130° C. In particular, the clamp liner 40 enables the spacer clamp arm 24 to grip the conductive cable 22 while maintaining a relative slip resistance of 1 kN for one minute. Preferably, this performance is achieved at temperatures above 130° C. on round or trapezoidal conductors. More preferably, the material that the clamp liner 40 is made from is also capable of resisting atmospheric ozone for a period of at least 10 years, and preferably 15 years, while continuing to meet the specified temperature, slip resistance, semi-conductive and electrical resistance requirements.

The outer surface of each clamp liner 40 is shaped to correspond to the inner surface of the keeper end portion 46. An inner surface 108 of each clamp liner 40 is shaped to correspond to the size and/or shape of the conductive cable 22 to which the spacer clamp arm 24 is intended to be clamped. In this way, when the clamp liners 40 are positioned in the opening 48, and the spacer clamp arm 24 is in the closed position, the clamp liner 40 fills the opening 48 and defines the inner surface 108 through which the conductive cable 22 can pass. The clamp liner 40 is made from an elastomeric material which provides a degree of resilience for damping, such that a controlled gripping pressure can be applied to the conductive cable 22. The clamp liner 40 also has a controlled size of the inner surface 108 relative to the diameter of the conductive cable 22, thereby reducing the strain at the interface between the conductive cable and the clamp liner.

Each liner half 80 of the clamp liner 40, according to one aspect, has the outer portion 82 and the inner portion 84 made from different semi-conductive elastomeric materials. The outer portion 82 is made from a semi-conductive fluoroelastomer compound, such as ethylene propylene diene monomer (EPDM). The inner portion 84 is made from a different semi-conductive fluoroelastomer compound, such as vinylidene fluoride hexafluoropropylene (FKM). The outer portion 82 occupies more than 50% of the volume in each liner half 80 of the clamp liner 40, and preferably about 65%. The inner portion 84 occupies less than 50% of the volume in each liner half 80 of the clamp liner 40, and preferably about 35%. This configuration provides excellent performance at a reasonable cost by using a minimal amount of the relatively costly FKM.

When using these elastomeric material compounds, it has been found that the required slip resistance can be achieved at temperatures up to about 200° C. when the geometry of the spacer clamp arm 24 and clamp liner 40 relative to the conductive cable 22 is arranged to provide in the region of 15% compression of volume in the clamp liner when the spacer clamp arm is secured to the conductive cable. This performance has been achieved on both round and trapezoidal conductors.

According to another aspect intended for even higher temperature service, for example up to about 250° C. or even about 300° C., the outer portion 82 is made from a semi-conductive fluoroelastomer compound, such as vinylidene fluoride hexafluoropropylene (FKM). The inner portion 84 is made from a different semi-conductive fluoroelastomer compound containing an even higher amount of fluoride than FKM, such as perfluoroelastomer (FFKM). The outer portion 82 occupies more than 50% of the volume in each liner half 80 of the clamp liner 40, and preferably about 65%. The inner portion 84 occupies less than 50% of the volume in each liner half 80 of the clamp liner 40, and preferably about 35%.

When using these compounds, it has been found that the required slip resistance can be achieved at temperatures up to about 250° C. when the geometry of the spacer clamp arm 24 and clamp liner 40 relative to the conductive cable 22 is arranged to provide in the region of 15% compression of volume in the clamp liner when the spacer clamp arm is secured to the conductive cable. This performance has been achieved on both round and trapezoidal conductors.

The material selection for the clamp liner 40 is not limited to EPDM, FKM and FFKM. The material selection for the clamp liner 40 could from a broad range of elastomers where different temperature, gripping or electrically semi-conductive, resistance and capacitive properties are required. The material selection for the clamp liner 40 may depend on a limiting factor such as cost or the electrical, chemical or mechanical property in contact with the conductive cable 22 or spacer clamp arm 24.

Figure 6:
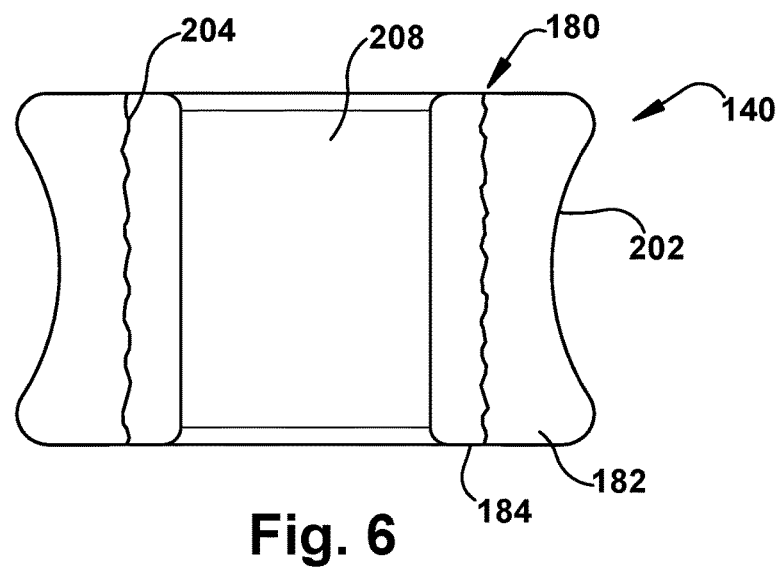
FIG. 6 is a plan view of the liner, similar to FIG. 5, according to another aspect.

According to yet another aspect illustrated in FIG. 6, liner halves 180 of a clamp liner 140 are provided as a single piece unit. At least one of the liner halves 180 of the clamp liner 140 is integrally formed as a single piece unit. A liner half 180 of the clamp liner 140 can be molded or extruded as separate parts of their respective different material. An outer portion 182 and an inner portion 184 of the liner half 180 can be co-extruded to provide the single piece half. Alternatively the outer portion 182 and inner portion 184 of the liner half 180 can be co-molded by use of compatible curing agents in the constituent elastomers that enable a mechanical cross linking between the outer portion 182 and the inner portion 184 extruded to provide the single piece half. The outer portion 182 and inner portion 184 of the liner half 180 can even be molded or extruded separately and bonded through use of a post mold vulcanization process (hot or cold) or adhesive bonding to provide the single piece half.

Thus, improved clamp liners 40, 140 are provided according to any aspect or combination of aspects. It will be appreciated that application of the clamp liners is not limited to spacer dampers but that one or more of the clamp liners provided herein may be used in other interphase spacers (e.g., such as those not having dampening mechanisms). One or more of the clamp liners provided herein may, for example, be used on clamping attachments for transmission line accessories attached to high temperature conductors such as but not limited to Stockbridge TypeVibration Dampers, Brettele Dampers, Festoon Dampers, Conductor clamps etc.

Certain terminology is used herein for purposes of reference only, and thus is not intended to be limiting. For example, terms such as "upper", "lower", "above", and "below" refer to directions in the drawings to which reference is made. Terms such as "left", "right", "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary aspects, the articles "a", "an" and "the" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

Although the description has been shown and described with respect to one or more embodiments, aspects, applications or implementations, it will occur to those skilled in the art based upon a reading and understanding of this description and the drawings that equivalent alterations and modifications may be made without detracting from the spirit and scope of the embodiments, aspects or implementations in the description. The description and claims are intended to include all such modifications and alterations.

What is claimed is:

1. A liner for use with a cable spacer clamp arm, the liner including:
   a first portion formed in an arcuate configuration and made from a first elastomeric material; and
   a second portion formed in the arcuate configuration and receivable within the first portion and made from a second elastomeric material and adapted to receive a portion of a cable that is supported by the cable spacer clamp arm and that extends along a cable axis,
   wherein the first portion attaches to the second portion, and:
      a first contact point, where the first portion contacts the second portion, is spaced a first distance from the cable axis along a first radial axis that is perpendicular to the cable axis;
      a second contact point, where the first portion contacts the second portion, is spaced a second distance from the cable axis along a second radial axis that is perpendicular to the cable axis; and
      the first distance different than the second distance.

2. The liner of claim 1 further including an opening in one of the first portion or the second portion and a projection on the other of the first portion or the second portion, wherein the projection is receivable in the opening to attach the first portion and second portion.

3. The liner of claim 1 wherein the first portion and the second portion are integrally formed as one piece.

4. The liner of claim 1 wherein the first portion and the second portion are bonded together.

5. The liner of claim 1 wherein the first elastomeric material is semi-conductive and selected from a group consisting of an ethylene propylene diene monomer and a fluoroelastomer.

6. The liner of claim 1 wherein the second elastomeric material is semi-conductive and selected from a group consisting of a fluoroelastomer and a perfluoro-elastomer.

7. The liner of claim 1 further including an annular outer surface shaped to fit within a similarly shaped inner surface of the cable spacer clamp arm.

8. The liner of claim 1 wherein the first portion and the second portion form an arcuate liner half.

9. The liner of claim 1 wherein the first portion has an inner concave surface and the second portion has an outer convex surface adapted to be received within the inner concave surface.

10. A liner for use with a cable spacer clamp arm, the liner including:
    a pair of liner halves, each liner half including:
       a first portion formed in an arcuate configuration and made from a first semi-conductive elastomeric material and adapted to be received in a keeper end portion of the cable spacer clamp arm; and
       a second portion formed in an arcuate configuration and receivable within the first portion and made from a second semi-conductive elastomeric material and adapted to receive a portion of a cable that extends along a cable axis,
       wherein an outer convex surface of the second portion is sized and shaped to be received in an inner concave surface of the first portion, the inner concave surface extending non-linearly along a direction that is parallel to the cable axis.

11. The liner of claim 10 further including a mechanism to attach the first portion and the second portion.

12. The liner of claim 10 wherein the first portion and the second portion are attached by being bonded together, adhesively attached, or being integrally formed as one piece.

13. The liner of claim 10 wherein the first semi-conductive elastomeric material is selected from a group consisting of an ethylene propylene diene monomer and a fluoroelastomer.

14. The liner of claim 10 wherein when the second portion receives the portion of the cable, the second portion is located radially outwardly from the cable, and the first portion is located radially outwardly from the second portion such that the second portion is in contact with:
    the cable at an inner radial side of the second portion along a radial axis that is perpendicular to the cable axis; and
    the first portion at an outer radial side of the second portion along the radial axis.

15. The liner of claim 10 wherein the first portion includes an annular outer surface shaped to fit within the inner concave surface of the cable spacer clamp arm.

16. An apparatus including:
    a conductive cable that extends along a cable axis;
    a spacer clamp arm for receiving the conductive cable; and
    a clamp liner receivable in the spacer clamp arm, the clamp liner including:
       a first portion formed in an arcuate configuration and made from a first elastomeric material; and
       a second portion formed in an arcuate configuration and receivable within the first portion and made from a second elastomeric material,
       wherein the first portion attaches to the second portion; and
       an outer convex surface on the second portion is sized and shaped to be received in contact with an inner concave surface of the first portion, the outer concave surface extending non-linearly along a direction that is parallel to the cable axis.

17. The apparatus of claim 16 wherein the first portion and the second portion attach by mechanical attachment, adhesive attachment, bonded attachment or being integrally forming as one piece.

18. The apparatus of claim 16 wherein the first elastomeric material and the second elastomeric material are selected from the group consisting of an ethylene propylene diene monomer, a fluoroelastomer and a perfluoro-elastomer.

19. The apparatus of claim 16 wherein the first portion includes an annular outer surface shaped to fit within a similarly shaped inner surface of the spacer clamp arm.

20. The apparatus of claim 16 wherein the first portion and the second portion include substantially identical arcuate halves.

* * * * *